3,386,836
PROCESS FOR THE PRODUCTION OF CURED MEAT PRODUCTS
Benjamin Borenstein, Teaneck, and Ernest Gordon Smith, Hawthorne, N.J., assignors to Hoffmann-La Roche Inc., Nutley, N.J., a corporation of New Jersey
No Drawing. Filed Sept. 9, 1964, Ser. No. 395,290
2 Claims. (Cl. 99—159)

ABSTRACT OF THE DISCLOSURE

The use of ethylenediamine tetraacetic acid, or a salt thereof, in combination with (1) a nitrite curing agent, or gaseous nitric oxide, and (2) ascorbic acid, an isomer of ascorbic acid or a salt of either, to accelerate the formation of cured meat pigments, is described.

---

This invention relates, in general, to an improved process for the production of cured meat products. More particularly, the invention relates to a method, and to compositions, for accelerating the rate at which fresh meat is cured.

It is well known in the art that an important aspect of fresh meat processing is the conversion of meat pigments, that is, myoglobin and hemoglobin, into heat-stable pink or red forms. Such conversion, commonly referred to as curing, is accomplished, ordinarily, by the treatment of fresh meat with an alkali metal nitrite-containing composition or with a composition containing a mixture of an alkali metal nitrite and an alkali metal nitrate. Other materials, such as, sodium chloride, sucrose, dextrose, maple sugar, etc., are generally present also in the curing mixture. Additionally, fresh meat can be cured by treating it with gaseous nitric oxide.

The mechanism of the reactions attendant the curing of meat has never been precisely ascertained. It is believed, however, that the alkali metal nitrite component of conventional meat curing compositions is converted into nitric oxide, which, in turn, reacts with myoglobin and hemoglobin to form nitrosomyoglobin and nitrosohemoglobin, respectively, and the heated counterparts thereof called nitrosohemechromagens. These pigments have the pink to red color which characterizes cured meats.

Over the years, certain improvements have been made in conventional meat curing processes. One of the most significant improvements came about as a result of the finding that ascorbic acid and isomers of ascorbic acid, such as, l-ascorbic acid and d-isoascorbic acid, as well as, alkali metal salts thereof, when used either in combination with an ordinary nitrite meat curing agent, or in conjunction with a gaseous nitric oxide cure, served to accelerate the rate of cure. Hence, by means of the use of an ascorbic compound in the curing process, it was possible to reduce the curing time.

The present invention is concerned with improvements in meat curing processes.

More particularly, the invention is concerned with a method for curing fresh meat and with meat cured by such method.

Thus, the present invention is based upon the unexpected discovery that ethylenediaminetetraacetic acid, and salts thereof, accelerate the formation of cured meat pigments when fresh meat is treated, by conventional methods and techniques, either with a nitrite curing agent, or, in the alternative with gaseous nitric oxide, in a system containing also ascorbic acid, an isomer of ascorbic acid, a salt of ascorbic acid or a salt of an isomer of ascorbic acid. For the sake of brevity, the term "ascorbic acid" will be used in this specification in a generic sense to denote not only ascorbic acid itself but also isomers of ascorbic acid and salts of ascorbic acid and of its isomers.

Broadly, the invention comprises a method of curing fresh meat in a system comprising (1) a conventional curing agent containing a nitrite salt, either alone or in admixture with a nitrate salt, or gaseous nitric oxide (2) ascorbic acid, as defined heretofore and (3) ethylenediamine tetraacetic acid or a salt thereof. The invention embraces also meat cured by such method as well as the ingredients, in combination, which are used in the method to effect the desired cure. The expression "conventional meat curing agent," as used herein, includes, but is not necessarily limited to, compositions containing, for example, from about 70.0% to about 95.0% by weight of salt, i.e., sodium chloride; from about 0% to about 25% by weight of a sugar or a mixture of two or more sugars, for example, sucrose, dextrose, maple sugar, etc.; and from about 0.5% to about 15.0% by weight of a nitrite salt, for example, an alkali metal nitrite, such as, sodium nitrite, either alone or in admixture with an alkali metal nitrate, such as, sodium nitrate. The expression "conventional meat curing agent" embraces also gaseous nitric oxide.

In the practice of this invention, fresh meat, such as, ham, beef, etc. is cured, by well known and conventional procedures and techniques, to produce, for example, sausage, cured ham, corned beef, etc. In carrying out the invention, fresh meat is treated with a conventional nitrite-containing or nitrite- and nitrate-containing curing agent or with nitric oxide; the mixture, which is thus obtained, is thereafter mixed with ascorbic acid and ethylenediaminetetraacetic acid, or a salt thereof; following which the fresh meat, thus treated, is cured under suitable curing conditions. The various ingredients can be added to the meat as is, for example, by sprinkling, or they can be added in the form of aqueous solutions.

It will be fully understood that the sequence in which the aforementioned ingredients are added to, and admixed with, the fresh meat has no effect whatsoever on the operability of the invention. For example, instead of first adding the nitrite-containing curing agent or the nitric oxide to the fresh meat, the ascorbic acid and the ethylenediaminetetraacetic acid, or the salt thereof, separately or in combination, could be added to, and mixed with the fresh meat. In such an instance, the conventional nitrite curing agent or nitric oxide would be incorporated into the meat at some subsequent point of time. In the alternative, either the ascorbic acid or the ethylenediaminetetraacetic acid, or a salt thereof, component could be added to, and mixed with, the fresh meat, with the other such ingredient being incorporated into the system following the addition of the curing agent.

As indicated heretofore, the practice of the present invention contemplates the utilization of conventional meat curing procedures, techniques and equipment. The invention is distinctive in the combination of ingredients used to effect the desired cure. However, the quantities of the various ingredients employed will vary rather within wide limits. Thus, for example, based upon the weight of the meat to be cured there will be used from about 0.5% to about 4.0% by weight of sodium chloride; from about 0.005% to about 0.03% by weight of nitrite salt or a mixture thereof with from about 0.005% to about 0.03% by weight of a nitrate salt; from about 0.010% to about 0.10% by weight of ascorbic acid; and from about 0.001% to 0.03% by weight of ethylenediaminetetraacetic acid or salt. Optionally, there may be used up to about 30.0% by weight of water; up to about 5.0% by weight of carbohydrates, such as, sugar, dextrose, etc.; and up to about 4.0% by weight of other conventional adjuvants, such as, phosphates, casein, milk products, etc.

In carrying out this invention, there is used ethylenediaminetetraacetic acid or a salt thereof. In general, any salt of ethylenediaminetetraacetic acid can be employed. Since, however, they are commercially available, disodium ethylenediaminetetraacetic acid, disodium calcium ethylenediaminetetraacetic acid, sodium ferric ethylenediaminetetraacetic acid, trisodium ethylenediaminetetraacetic acid, tetrasodium ethylenediaminetetraacetic acid, and dihydrogen ferrous ethylenediaminetetraacetic acid are preferably used.

Moreover, as indicated heretofore, the term "ascorbic acid," which is used throughout the specification, denotes ascorbic acid itself as well as salts thereof. The term embraces also isomers of ascorbic acid as well as salts of such isomers. Thus, in carrying out the invention there is used ascorbic acid, e.g. l-ascorbic acid; isoascorbic acid, e.g. d-isoascorbic acid; etc. and salts of such acids. The salts which are suitable for use include, for example, water-soluble alkali-metal salts of the acids, such as, the sodium and potassium salts of l-ascorbic acid, d-isoascorbic acid, etc.

The present invention is commercially advantageous for several reasons. It has been established that, in processes of curing fresh meat using gaseous nitric oxide or conventional nitrite-containing curing agents and ascorbic acid, the formation of cured meat pigments can be accelerated greatly by means of the use of ethylenediaminetetraacetic acid or a salt thereof. Acceleration of the rate of curing is not significantly affected by trace minerals, such as iron and copper, in the quantities in which they are normally present in ordinary water supplies. Thus, in accelerating the curing process and, hence, permitting substantial reductions in curing time, the present invention provides a means for effecting substantial economies in the meat curing industry. This highly desirable result is achieved without the necessity of modifying or altering the procedures and techniques, which are so well known and widely used in the meat curing industry, and it is accomplished without incurring any expense in the acquisition and maintenance of complicated and costly processing equipment. An ancillary advantage of the present invention resides in the fact that, the fresh meat can be cured, if desired, at temperatures higher than those normally employed. Under ordinary circumstances, fresh meat is cured by retaining it, for an appropriate period of time, in an environment, e.g., a smoke house, which is heated above ordinary room temperature. Generally, curing is effected by allowing the fresh meat, combined with the curing agent and other adjuvants, to stand in an environment heated at a temperature within the range of from about 125° F. to 190° F., and preferably at a temperature of from about 150° F. to 170° F. It has been found that, when fresh meat is cured in the manner described herein, completely satisfactory results are obtained even when the curing is carried out in an atmosphere which is heated to a temperature of up to about 250° F. On the other hand, acceleration of the formation of nitrosoheme pigments, can be effected, in the manner described herein, even at temperatures below normal room temperatures.

For a fuller understanding of the nature and objects of this invention, reference may be had to the following examples, which are given as further illustrations of the invention and are not to be construed in a limiting sense.

Example 1

In this example, three pounds of fresh meat comprising a mixture of 1.5 pounds of pork shoulder and 1.5 pounds of beef chuck were ground, in a conventional sausage chopper known as a Silent Cutter, with 39.0 grams of sodium chloride, 3.4 grams of a commercial meat curing salt containing 6% of sodium nitrite and with 300 ml. of water. The resulting emulsion was divided into two aliquots.

To one of the aliquots, there was added, the following named ingredients in the quantities hereinafter indicated:

|  | Ml./pound of meat |
|---|---|
| Permacurate (2.5% solution) | 5 |
| Ethylenediaminetetraacetic acid disodium salt (2.25% solution) | 5 |
| Trace minerals: Solution containing 20 p.p.m. $Fe^{+++}$ and 5 p.p.m. $Cu^{++}$ (as ferric chloride and cupric chloride, respectively) | 100 |

For control purposes, there was added to the other aliquot, the following ingredients in the quantities hereinafter indicated:

|  | Ml./pound of meat |
|---|---|
| Permacurate (2.5% solution) | 5 |
| Water | 5 |
| Trace minerals: Solution containing 20 p.p.m. $Fe^{+++}$ and 5 p.p.m. $Cu^{++}$ (as ferric chloride and cupric chloride, respectively) | 100 |

Permacurate, which is referred to in this paragraph, is the trademark for a product containing 92% of sodium ascorbate and 8% of sodium chloride.

The aliquot containing the ethylenediaminetetraacetic acid disodium salt was thoroughly mixed and the mixture, thus obtained (hereinafter designated as Experiment 1) was divided into 100 gram portions which were pressed into sausage chubs in 250 ml. beakers. The aliquot containing no ethylenediaminetetraacetic acid disodium salt was also thoroughly mixed and the mixture, thus obtained, (hereinafter designated as Control 1) was divided into 100 gram portions which were pressed into sausage chubs in 250 ml. beakers. Each of the beakers were, thereafter, retained at room temperature for a period of five minutes. At the end of that period of time, all of the beakers were heated in a thermostatically controlled water-bath at a temperature of 73° C. to 75° C. At the time intervals, shown in the table which follows hereinafter, one beaker containing the ethylene-diaminetetraacetic acid disodium salt-meat mixture was removed from the water-bath and one beaker containing the control meat mixture, that is, the mixture containing no ethylenediaminetetraacetic acid disodium salt, was similarly removed from the water-bath. Thereafter, the sausage chub was removed from each beaker, cut in half and the depth of penetration of cured pigment observed. The results of this experiment, measured in terms of percent penetration of cured meat pigment in a given period of time, are shown in the table which follows hereinafter:

TABLE I

| Minutes | Percent Penetration of Cured Meat Pigment | | | | | |
|---|---|---|---|---|---|---|
|  | 15 | 20 | 25 | 30 | 35 | 45 |
| Experiment No: |  |  |  |  |  |  |
| 1 | 50 |  | 9 |  | 100 | 100 |
| Control 1 | 20 |  | 80 |  | 95 | 100 |

The visual observations, reported in Table I, correlated well with assays for nitroso heme pigments conducted by the Hornsey method, described in the Journal of the Science of Food and Agriculture, 7, 534 (1956). It was observed, visually, also that, at all reported time periods, the meat cured using the mixture containing the ethylenediaminetetraacetic acid disodium salt had a slightly darker cured color than the control.

Example 2

Seventeen separate meat emulsions were prepared in the manner described, and using the same quantities of meat, salt, nitrite curing agent and water set forth in Example 1. Each emulsion was divided into two aliquots, one such aliquot to be used to evaluate the meat curing process of this invention, the other being used for control purposes. There is set forth in the table which follows herein, opposite the experiment number, the ingredients, and the quantities thereof, which were incorporated into one of the aliquots of each emulsion, the quantities in each instance being given in terms of grams of the component per pound of meat. Set forth in the table, also, are the ingredients, and the quantities thereof, that were incorported into those aliquots which were to be used for control purposes. The control experiments are denoted in the table by the experiment number followed by the letter C.

TABLE II.—GRAMS PER POUND OF MEAT

| Experiment No.: | Ethylenediamine-tetraacetic acid salt | Sodium Ascorbate | Trace Minerals [1] | |
|---|---|---|---|---|
| | | | Fe+++ | Cu++ |
| 2 | 0.125 | 0.125 | 0.002 | 0.0005 |
| 2-C | None | 0.125 | 0.002 | 0.0005 |
| 3 | 0.010 | [2] 0.125 | None | None |
| 3-C | None | [2] 0.125 | None | None |
| 4 | 0.091 | [2] 0.125 | None | None |
| 4-C | None | [2] 0.125 | None | None |
| 5 | 0.010 | [2] 0.125 | 0.002 | 0.0005 |
| 5-C | None | [2] 0.125 | 0.002 | 0.0005 |
| 6 | 0.091 | [2] 0.125 | 0.002 | 0.0005 |
| 6-C | None | [2] 0.125 | 0.002 | 0.0005 |
| 7 | 0.023 | 0.230 | None | None |
| 7-C | None | 0.250 | None | None |
| 8 | 0.023 | 0.230 | 0.002 | 0.0005 |
| 8-C | None | 0.250 | 0.002 | 0.0005 |
| 9 | 0.023 | 0.125 | 0.002 | 0.0005 |
| 9-C | None | 0.125 | 0.002 | 0.0005 |
| 10 | 0.091 | 0.113 | None | None |
| 10-C | None | 0.113 | None | None |
| 11 | 0.023 | 0.113 | 0.002 | 0.0005 |
| 11-C | None | 0.113 | 0.002 | 0.0005 |
| 12 | 0.091 | 0.113 | 0.002 | 0.0005 |
| 12-C | None | 0.113 | 0.002 | 0.0005 |
| 13 | 0.023 | 0.113 | None | None |
| 13-C | None | 0.113 | None | None |
| 14 | 0.091 | 0.113 | None | None |
| 14-C | None | 0.113 | None | None |
| 15 | 0.091 | 0.113 | 0.002 | 0.0005 |
| 15-C | None | 0.113 | 0.002 | 0.0005 |
| 16 | 0.091 | 0.113 | 0.002 | 0.0005 |
| 16-C | None | 0.113 | 0.002 | 0.0005 |
| 17 | 0.023 | [3] 0.125 | None | None |
| 17-C | None | [3] 0.125 | None | None |
| 18 | 0.091 | [3] 0.125 | None | None |
| 18-C | None | [3] 0.125 | None | None |

[1] Trace minerals added as ferric chloride and cupric chloride.
[2] A mixture of 92% sodium ascorbate and 8% sodium chloride.
[3] Sodium isoascorbate.

In all of the experiments, except Experiments 10, 11, 12, 13, 14 and 16, the disodium salt of ethylenediaminetetraacetic acid was used. In Experiments Nos. 10, 11, 12, 13, 14 and 16, the disodium calcium salt of ethylenediaminetetraacetic acid was used. Moreover, as indicated heretofore, sodium isoascorbate was used in Experiments 17 and 18. The ingredients listed in the table were added in the form of dilute aqueous solutions.

With a certain exception, the various aliquots were treated as described in Example 1, that is, they were divided into 100 gram portions, placed in beakers, kept at room temperature for a period of five minutes following which they were heated in a thermostatically controlled water-bath at a temperature of 73° C. to 75° C. In the case of Experiment No. 2 the chubs were held for three hours at a temperature of 40° F., following which they were cooked as heretofore described.

The table which follows sets forth the depth of penetration of cured pigment observed when one beaker, for each experiment and for each control, was removed from the water-bath at the end of the designated time period.

TABLE III

| Minutes: | Percent Penetration of Cured Meat Pigment | | | | | |
|---|---|---|---|---|---|---|
| | 15 | 20 | 25 | 30 | 35 | 40 |
| Experiment No.: | | | | | | |
| 2 | 40 | | 90 | | 100 | 100 |
| 2-C | 20 | | 75 | | 90 | 100 |
| 3 | 20 | | 50 | 75 | 95 | 100 |
| 3-C | 10 | | 40 | 60 | 90 | 100 |
| 4 | 20 | | 70 | 90 | 100 | 100 |
| 4-C | 10 | | 40 | 60 | 90 | 100 |
| 5 | 15 | | 40 | 75 | 95 | |
| 5-C | 10 | | 25 | 65 | 85 | |
| 6 | 20 | | 65 | 95 | 100 | |
| 6-C | 10 | | 25 | 65 | 85 | |
| 7 | 20 | 40 | 80 | 100 | | |
| 7-C | 10 | 20 | 50 | 90 | | |
| 8 | 20 | 75 | 95 | 100 | | |
| 8-C | 10 | 30 | 75 | 90 | | |
| 9 | | 25 | 50 | 75 | 90 | |
| 9-C | | 5 | 25 | 40 | 65 | |
| 10 | 30 | | 75 | 98 | 100 | |
| 10-C | 15 | | 65 | 90 | 95 | |
| 11 | 40 | | 90 | 100 | 100 | |
| 11-C | 30 | | 75 | 95 | 100 | |
| 12 | 40 | | 90 | 100 | 100 | |
| 12-C | 30 | | 75 | 95 | 100 | |
| 13 | 25 | | 80 | 95 | 100 | |
| 13-C | 10 | | 50 | 75 | 90 | |
| 14 | 25 | | 80 | 95 | 100 | |
| 14-C | 10 | | 50 | 75 | 90 | |
| 15 | 40 | 90 | 95 | 100 | | |
| 15-C | 25 | 33 | 85 | 90 | | |
| 16 | 40 | 95 | 100 | 100 | | |
| 16-C | 25 | 33 | 85 | 90 | | |
| 17 | 25 | | 50 | 90 | 95 | |
| 17-C | 10 | | 25 | 75 | 90 | |
| 18 | 50 | | 75 | 100 | 100 | |
| 18-C | 10 | | 25 | 75 | 90 | |

The results shown in the foregoing table serve to demonstrate the effectiveness of ethylenediaminetetraacetic acid salts in accelerating the curing of fresh meat. The visual observations set forth correlate well with assays for nitroso heme pigment, conducted by the Hornsey method.

Additionally, in a majority of instances where the ethylenediaminetetraacetic acid salt was employed, a deeper cured hue was observed.

Example 3

In this example, two separate meat emulsions were prepared in the manner described, and using the same quantities of meat, salt, nitrite curing agent and water set forth, in Example 1. In this example, all beef was used rather than the pork-beef mixture used in Example 1. Each emulsion was divided into two aliquots, one such aliquot to be used to evaluate the meat curing process of the invention, the other being used for control purposes. In the table which follows hereinafter, opposite the experiment numbers, namely, Experiments 19 and 20, there is set out the ingredients, and the quantities thereof, which were incorporated into one of the aliquots of each emulsion. Set forth in the table also are the ingredients, and the quantities thereof, that were incorporated into those aliquots which were used for control purposes. The quantities, in all instances, are given in terms of grams of the component per pound of meat.

TABLE IV.—GRAMS PER POUND OF MEAT

| Experiment No.: | Ethylenediamine-tetraacetic acid salt | Sodium Ascorbate | Trace Minerals [1] | |
|---|---|---|---|---|
| | | | Fe+++ | Cu++ |
| 19 | 0.023 | 0.113 | 0.002 | 0.0005 |
| 19-C | None | 0.113 | 0.002 | 0.0005 |
| 20 | 0.091 | 0.113 | 0.002 | 0.0005 |
| 20-C | None | 0.113 | 0.002 | 0.0005 |

[1] Trace minerals added as ferric chloride and cupric chloride.

In all four experiments, the disodium salt of ethylenediaminetetraacetic acid was used.

In each instance, the aliquots were treated in the manner described in Example 1, that is, they were divided into 100 gram portions in 250 ml. beakers, retained at room temperature for a period of five minutes, following which they were heated in a thermostatically controlled water-bath at a temperature of 72° C. to 75° C.

The table which follows set forth the depth of penetration of cured pigment observed when one beaker, for each experiment and each control, was removed from the water-bath at the end of the designated time period.

TABLE V

| Minutes | Percent Penetration of Cured Meat Pigment | | | | | |
|---|---|---|---|---|---|---|
| | 15 | 20 | 25 | 30 | 35 | 40 |
| Experiment No.: | | | | | | |
| 19 | 25 | 50 | 70 | ------ | 95 | ------ |
| 19-C | 10 | 20 | 35 | ------ | 65 | ------ |
| 20 | 35 | 75 | 95 | ------ | 100 | ------ |
| 20-C | 10 | 20 | 35 | ------ | 65 | ------ |

The results which are set forth in the foregoing table indicate the effectiveness of ethylenediaminetetraacetic acid disodium salt in accelerating the curing of fresh beef. The visual observations, which are reported in the table, correlate well with assays for nitroso heme pigment, conducted by the Hornsey method.

Example 4

In this example, a pork loin, about seven inches in length was cut into six replicate 1⅛″ thick chops. The chops, 230 (±20) grams each in weight, were designated 1 to 6 as they were cut from the loin.

Two gallons of meat curing pickle were prepared by dissolving sufficient sodium chloride in water to produce a 50° salometer reading. This corresponded to a solution containing about 13 percent of salt. To this solution there was added 170 grams of Prague Powder (a commercial meat curing composition containing 4% sodium nitrate and 6% sodium nitrite). The solution, thus formed, had a pH of 6.30. This pickle was divided into three 1500 ml. portions. The first such portion was maintained for control purpose. To the second portion there was added 8.5 grams of sodium ascorbate. To the third there was added 4.5 grams of sodium ascorbate and 1.5 grams of disodium calcium ethylenediaminetetraacetic acid.

Two chops were placed in each pickle and the pickles were stored at a temperature of 40° to 45° F. The chops were examined visually at the end of seventeen and forty-one hours storage. At the end of seventeen hours, the chops stored in the control pickle were grey-brown in color, while the chops stored in the sodium ascorbate pickle had a medium red color. At the end of the same seventeen hours, the chops stored in the pickle containing sodium ascorbate and the disodium calcium salt of ethylenediaminetetraacetic acid had an excellent red color.

At the end of forty-one hours of storage, the chops which were stored in the control pickle were brown to slightly red whereas the chops in the other two pickles were dark red.

After forty-one hours' storage, the chops were removed from the pickle and oven cooked at 161° to 167° F. for a period of 115 minutes. At the end of that time, the chops which had been stored in the control pickle were medium red whereas those which had been stored in the sodium ascorbate pickle were a brighter, darker red. The chops, which had been stored in the sodium ascorbate-ethylenediaminetetraacetic acid salt-containing pickle had an excellent cured hue, superior to those of the other four chops.

Example 5

In this example, three pounds of a mixture of fresh pork and beef (50:50) were mixed with 39.0 grams of sodium chloride and 350 ml. of water. This mixture was ground with 3.0 grams of a mixture containing the following named ingredients in the proportions hereinafter indicated:

MIXTURE I

| | Percent |
|---|---|
| Sodium chloride | 80.26 |
| Sodium nitrite | 6.07 |
| Sodium nitrate | 4.07 |
| Sodium ascorbate | 8.00 |
| Disodium ethylenediaminetetraacetic acid | 1.60 |

The resulting sausage emulsion was filled into cellulose sausage casing 24 mm. in diameter, tied at six inch intervals and cooked in an oven at 170° F. for fifty minutes.

Sausage having outstanding full cured color was thus obtained.

Example 6

In this example, products were prepared by the method described in Example 5 using, with but one exception, the same ingredients and the same quantities thereof as were used in Example 5. In producing the products of this example, Mixture I of Example 5 was replaced by the following curing salt mixtures:

| Ingredients | Proportions in Percentages | | | | | |
|---|---|---|---|---|---|---|
| | A | B | C | D | E | F |
| Sodium chloride | 80.26 | 79.26 | 80.26 | 83.26 | 86.1 | 77.9 |
| Sodium nitrite | 6.07 | 6.07 | 6.07 | 6.07 | 4.0 | 7.07 |
| Sodium nitrate | 4.07 | 4.07 | 4.07 | 4.07 | ------ | 4.03 |
| Sodium ascorbate | 8.0 | 6.0 | 8.0 | ------ | 9.0 | 10.0 |
| Sodium isoascorbate | ------ | ------ | ------ | 5.0 | ------ | ------ |
| Ethylenediaminetetraacetic acid salt | 1.6 | 1.6 | 1.6 | 1.6 | 0.9 | 1.0 |
| Sodium bicarbonate | ------ | 3.0 | ------ | ------ | ------ | ------ |

In producing Mixtures A, B, D and F, the disodium salt of ethylenediaminetetraacetic acid was employed. In preparing Mixture C, the disodium calcium salt of ethylenediaminetetraacetic acid was used. Mixture E contained the sodium ferric salt of ethylenediaminetetraacetic acid.

The various sausage emulsions were filled into cellulose sausage casings and tied, as described in Example 5, and they were cooked in an oven at a temperature of 170° F. for fifty minutes.

Sausage having excellent full cured color was thus obtained.

Example 7

In this example, three pounds of a fresh pork-beef mixture (50:50) was ground with 40.0 grams of sodium chloride, 3.0 grams with Mixture I of Example 5 and 350 ml. of water. The resulting emulsion was filled in cellulose sausage casing 24 mm. in diameter, tied at six inch intervals and the filled casings were cooked in an oven. The oven temperature was 230° F. After a period of twenty-eight minutes, a full cured color had developed, the internal temperature of the sausage was 155° F.

Example 8

In this example, two products were prepared by the method described in Example 5, using, with but one exception, the same ingredients and the same quantities thereof as were used in Example 5. In producing the first product of this example, the sodium ascorbate component of Mixture I of Example 5 was replaced by l-ascorbic acid. In producing the second product of the example, the sodium ascorbate component of Mixture I was replaced with d-isoascorbic acid.

In each instance, there was obtained sausage having full cured color.

Example 9

(a) In this example, there was added to, and mixed with 1 pound of beef, the following named ingredients in the quantities hereinafter indicated:

| | | |
|---|---|---|
| Sodium chloride | grams | 13.5 |
| Curing salt | do | 1.1 |
| Water | ml | 100 |

The curing salt employed was the same as that used in Example 1. To this mixture, there was added 20 ml. of a 0.75% by weight, solution of ethylenediaminetetraacetic acid and 2.5 ml. of a 5% by weight, solution of sodium ascorbate. The resulting mixture was placed in beakers and cooked in a water-bath at a temperature within the range of from about 72° to 75° C. for a period of about forty minutes.

There was, thus obtained, a meat product having good full cured color.

(b) In this example, there was added to 1 pound of beef, the following named ingredients in the quantities hereinafter indicated:

| | |
|---|---|
| Sodium chloride _____grams__ | 13.5 |
| Curing salt _____do____ | 1.1 |
| Water _____ml__ | 100 |

The curing salt employed was the same as that used in section (a) of this example. To this mixture there was added 2.5 ml. of 5%, by weight, solution of sodium ascorbate and 20 ml. of a 0.75%, by weight, solution of dihydrogen ferrous ethylenediaminetetraacetic acid. The mixture was then placed in beakers which were cooked in a water-bath at a temperature within the range from about 72° to 75° C. for a period of about forty minutes.

The meat product, thus obtained, was characterized by its good, full cured color.

Example 10

(a) In this example, 2 pounds of a pork-beef mixture were ground with 20 ml. of water, 30 grams of sodium chloride, 2.0 grams of commercial curing salt and 4.5 grams of a frankfurter seasoning, the formulation of which is described hereinafter. The curing salt employed herein was the same as that used in Example 1. This mixture was stuffed into suitable casings, tied at 6-inch intervals and cooked in an oven at a temperature of about 170° F. for a period of about fifty minutes.

Frankfurters, having good full cured color, were thus obtained.

(b) The procedure described in section (a) of this example was repeated using 2.0 pounds of meat, 200 ml. of water, 30 grams of sodium chloride, 2.0 grams of a commercial curing salt and 4.5 grams of a bologna seasoning, the formulation of which is described hereinafter. The curing salt employed herein was the same as that employed in section (a) of this example.

The meat product, obtained by cooking at 170° F. for fifty minutes was characterized by a full cured color.

The frankfurter seasoning which was used in section (a) of this example contained the following named ingredients, in the quantities hereinafter indicated:

| | Grams |
|---|---|
| Sodium chloride _____ | 85.00 |
| Dextrose _____ | 5.00 |
| Ground spices (paprika, mace, black pepper) ____ | 3.00 |
| Oils and oleoresins (capsicum, nutmeg, coriander, ginger, sesame, allspice, celery and cloves) ____ | 2.20 |
| Disodium ethylenediaminetetraacetic acid _____ | 0.70 |
| Sodium ascorbate _____ | 5.00 | the bologna seasoning which was used in section (b) of this example was prepared using the following named ingredients in the quantities hereinafter indicated:

| | Grams |
|---|---|
| Salt _____ | 56.00 |
| Dextrose _____ | 30.00 |
| Ground spices (paprika, mace, black pepper) ____ | 10.00 |
| Oils and oleoresins (capsicum, nutmeg, coriander, ginger and sesame) _____ | 1.75 |
| Sodium isoascorbate _____ | 2.25 |
| Sodium ferric ethylenediaminetetraacetic acid ____ | 0.18 |

We claim:

1. A process for the production of cured meat products consisting of treating fresh meat with (a) a curing agent comprising a member selected from the group consisting of a nitrite salt, a mixture of a nitrite salt and a nitrate salt, gaseous nitric oxide and mixtures thereof, (b) a compound selected from the group consisting of ascorbic acid, isoascorbic acid and a salt thereof and (c) a compound selected from the group consisting of ethylenediaminetetraacetic acid and a salt thereof, said ingredients (b) and (c) serving to accelerate the formation of cured meat pigments, there being employed in said process, based on the weight of the meat to be cured, a sufficient quantity of ingredient (a) to provide the equivalent of from about 0.005% to about 0.03% by weight of a nitrite salt, from about 0.010% to about 0.10% by weight of ingredient (b) and from about 0.001% to about 0.03% by weight of ingredient (c).

2. A process for the production of cured meat products consisting of (1) treating fresh meat with (a) a curing agent comprising a member selected from the group consisting of a nitrite salt, a mixture of a nitrite salt and a nitrate salt, gaseous nitric oxide and mixtures thereof, (b) a compound selected from the group consisting of l-ascorbic acid, d-isoascorbic acid and a salt thereof and (c) a salt of ethylenediaminetetraacetic acid, said ingredients (b) and (c) serving to accelerate the formation of cured meat pigments, and (2) heating the mixture at a temperature within the range of from about 125° F. to about 250° F., there being employed in said process, based on the weight of the meat to be cured, a sufficient quantity of ingredient (a) to provide the equivalent of from about 0.005% to about 0.03% by weight of a nitrite salt, from about 0.010% to about 0.10% by weight of ingredient (b) and from about 0.001% to about 0.03% by weight of ingredient (c).

References Cited

UNITED STATES PATENTS

| 3,154,421 | 10/1964 | Voegeli et al. | 99—159 |
| 2,828,212 | 3/1958 | Sair | 99—159 |
| 3,003,883 | 10/1961 | Levy | 99—159 |
| 3,154,423 | 10/1964 | Voegeli et al. | 99—159 |
| 3,240,612 | 3/1966 | Wolnak | 99—222 |

HYMAN LORD, *Primary Examiner.*